United States Patent [19]

Kerr

[11] Patent Number: 4,579,579

[45] Date of Patent: Apr. 1, 1986

[54] METHOD FOR PREPARING A SLOW-RELEASE FERTILIZER

[75] Inventor: Thomas J. Kerr, Athens, Ga.

[73] Assignee: Nitrogen Plus, Inc., Hendersonville, N.C.

[21] Appl. No.: 720,951

[22] Filed: Apr. 8, 1985

[51] Int. Cl.[4] ............................................. C05F 11/00
[52] U.S. Cl. ........................................ 71/23; 71/26; 71/64.11; 71/65; 71/79; 71/904; 71/DIG. 1; 424/16
[58] Field of Search ........................ 71/1, 6, 7, 11, 23, 71/24, 904, 25, 26, 64.11, 3, DIG. 1; 426/648, 807; 119/1; 424/16

[56] References Cited

U.S. PATENT DOCUMENTS

| | | | |
|---|---|---|---|
| 1,993,434 | 3/1935 | Champney | 71/904 |
| 3,259,501 | 7/1966 | Ulrey | 71/23 X |
| 3,878,304 | 4/1975 | Moore | 426/648 X |
| 4,369,199 | 1/1983 | Katzen | 426/807 |

*Primary Examiner*—Ferris H. Lander
*Attorney, Agent, or Firm*—David M. Carter; Jack H. Hall

[57] ABSTRACT

A process for the preparation of a slow-release fertilizer comprising the steps of:
(a) grinding a first volume of peanut hulls to a particle size of 1/32 to ¼ inch and a second volume to ⅛ to ½ inch,
(b) treating said first a volume of hulls with an equal volume of 2N (normal) nitric acid for 30 minutes at 121 degrees C. and 15 p.s.i. pressure to extract and solubilize the liqueous material from the hulls,
(c) adding 1 volume of 1 normal solubilized sodium hydroxide to 2 volumes of said second volume of peanut hulls and heating and stirring said mixture until said nutrients are solubilized,
(d) heating said second volume of peanut hulls and sodium hydroxide with steam and at a temperature of 121 degrees C. and pressure of 15 p.s.i. for 30 minutes to open the fibers of said hulls,
(e) adding fertilizer nutrients, such as commercially available potash or other source of potassium, super phosphate or other source of phosphate and ammonium nitrate or other source of nitrogen, to liquid waste material from the beer brewing industry containing either live or autolyzed yeast or other biological waste material,
(f) drying said heat-treated peanut hulls, whereby the fibers of the hulls close, entrapping said nutrients and said waste material,
(g) soaking said dried, impregnated hulls with the lignin-containing liquid from step (b), and
(h) drying the peanut hulls.

In another embodiment, the biological waste material is added to the peanut hulls as a solubilizing liquid with the sodium hydroxide in step (c), and the fertilizer nutrients are added only after the heat treatment is completed.

Also, a slow-release fertilizer comprising comminuted peanut hulls, impregnated with yeast-containing or other biological waste materials and inorganic nutrients and coated with lignin derived from peanut hulls by solubilizing with 2N nitric acid. The nutrients are only released to the soil on decomposition of the peanut hulls.

21 Claims, No Drawings

METHOD FOR PREPARING A SLOW-RELEASE FERTILIZER

FIELD OF THE INVENTION

The present invention relates to slow-release products, such as fertilizers, etc., and a method for making such products based on peanut hulls impregnated with, e.g., plant nutrients.

RELATED APPLICATIONS

In application Ser. No. 850,522 filed Nov. 11, 1977, now abandoned, a process for the preparation of a slow-release fertilizer was disclosed in which ground peanut hulls are impregnated with a solution of nutrient salts, heated with steam under pressure and dried. Application Ser. No. 850,522 is hereby incorporated by reference.

BACKGROUND OF THE INVENTION

There have been many attempted methods for providing for the slow release of fertilizer.

Lehr (U.S. Pat. No. 2,019,824) disclosed the use of "water resisting peat" produced by compressing a mixture of peat and fertilizer at 130–150 kg./sq. cm. without heat.

Treeland (U.S. Pat. No. 2,165,592) taught impregnating absorbent granular material, such as pulp or sawdust, with a saturated solution of ammonium sulfate, muriate of potash and water and mixing the impregnated granules with 90% powdered graphite and 10% carbon black to coat and to close the pores of the granules which are mixed with super Phosphate and black loam soil.

Genz (U.S. Pat. No. 1,944,788) proposed the in situ formation of plant nutrients in industrial waste products, such as tobacco stems by treating stems impregnated with the acid or basic constituent of the nutrient with an acid or alkali to produce crystalline salts in the matrix.

Rose (U.S. Pat. No. 371,630) taught the use of vegetable material being used to adsorb "tank water" (water from the rendering of lard, tallow and other fats), then dried and used as fertilizer.

Bierlich (U S. Pat. No. 2,498,480) employs various cellulosic refuse as a carrier for chemical fertilizer. The cellulosic material is purified or depitched, then chemical fertilizer is added under pressure along with bentonite to retain it in the cellulosic material.

Hoblit (U.S. Pat. No. 3,252,785) discloses spraying a mixture of ammonia and/or urea nitrogen, phosphoric acid, potassium as $K_2SO$ or $KCl$ and a dye onto a particulate carrier, e.g., cobs, nutshells and sawdust, and other dry ingredients such as ureaform and potash, whereby some of the nutrient solution is absorbed into the granules and the balance of the solution coats the granules and binds the other dry ingredients to the granules.

Sherwin et al (U.S. Pat. No. 3,940,257) mixed one part of seaweed with 10 parts of tree bark and pulverized the mixture so that the juice of the seaweed is absorbed by the bark.

A slow-release fertilizer according to Attoe (U.S. Pat. No. 3,059,379) encloses soluble fertilizer in water-impervious bags provided with a plurality of perforations.

Trocino's slow release fertilizer (U.S. Pat. No. 3,929,446) is derived from Douglas fir bark, previously dewaxed and freed of cork with an organic solvent, after which bark is mixed with liquid fertilizer and pelletized.

The use of expanded vermiculite, nutrient material and a binder to prepare a slow-release fertilizer is disclosed by Barron in U.S. Pat. No. 3,369,884.

Barton (U.S. Pat. No. 3,953,191) employs cotton gin waste as a carrier for fertilizer. The waste material is heated in a superheated chamber at 215 degrees F., and 30 p.s.i., with a fertilizer and pelletized.

A slow-release fertilizer according to Taylor (U.S. Pat. No. 3,672,945) consists of a solid core of inert material, such as solid fertilizer or nutshells, and a water-soluble inert adhesive. This material is coated with a powder of finely ground calcite, dolmite, sand, clay or pumice, to which agricultural chemicals or nutrients are applied.

Heming et al (U.S. Pat. No. 3,645,714) describe preparing a slow release fertilizer of tree bark, which is hammer milled to pass 90% through a 10 mesh screen, mixed with water and a commercial fertilizer, and pelleted.

Baskin (U.S. Pat. No. 3,558,299) prevents caking of particulate urea by coating with 3–5% of a conditioner selected from the group consisting of finely divided clay, talc, mica, vermiculite, powdered nutshells and pulverized corn cobs blended with urease.

Slow-release fertilizers are also prepared by coating granules of fertilizer with an insoluble substance. Examples are Smith (U.S. Patent No. 3,150,955), who used area-formaldehyde; Zaayenga (U.S. Pat. No. 3,192,031), who used wax, and Hanson (U.S. Pat. No. 3,264,089), who used organic resins. Pole (U.S. Pat. No. 2,806,773) taught the use of silicates and water insoluble organic resins to coat minor element particles and adhere them to inert carriers.

Sticks, stakes and cartridges have been used to release fertilizer slowly into the soil. Antrium (U.S. Pat. 2,032,608) produced a fertilizer stake by compressing a mixture of cellular fibrous material and a binder with a large amount of water and a fertilizer. Laffler et al (U.S. Pat. No. 2,931,140) disclosed a cartridge with small holes in the nose cone to slowly release the fertilizer. Gessler (U.S. Pat. No. 3,057,713) described a fertilizer stick made form a mixture of super phosphate fertilizer, asbestos, phosphoric acid and water. Prack (U.S. Pat. No. 3,060,012) disclosed a cartridge of sawdust, corn cobs or other organic material, nutrients and waterproofing chemicals. The cartridge is made with a series of concentric rings designed to release nutrients slowly. Schenk (U.S. Patent No. 3,502,458) teaches that a rigid slow-release fertilizer stake that can be driven into the ground is made by mixing a dry fibrous organic material, e.g., corn cobs, peat moss or cloth linters, a dry fertilizer and at least 3% binder and heating the mixture up to 380 degrees F. at a pressure of 100–8000 p.s.i. to form a rigid mass.

Wahlberg (U.S. Pat. No. 4,246,018), who produces a fertilizer from tree bark, adds yeast to waste molasses to ferment the molasses and lower the pH thereof before combining and treating the molasses and crushed tree bark at elevated temperature and pressure.

Sproull et al (U.S. Pat. No. 3,218,149) feeds a preheated nutrient solution to a pre-heated base material, e.g., bark or sawdust to a mixing reactor where the nutrient materials are chemically bound to the base by chemical reactions. The combined fertilizer, mulch and soil conditioner releases nutrients only as the base material decays.

Ford (U.S. Pat. No. 4,145,202) incorporates grass seed and nutrients in comminuted peanut hulls, which have been freeze-dried in order to increase voids in the hulls and, consequently, receptivity to the seeds and nutrients.

In the above-mentioned application, Serial No. 850,522, peanut hulls were proposed as a carrier for liquid plant nutrients impregnated thereon to provide a slow-release fertilizer. However, the release of the nutrients is not as uniform and long-lasting as desired. Until the present invention, in fact, there were no important uses for peanut hulls. They could not be used as mulch or as organic material since they did not degrade and, furthermore, they have been found to promote the growth of Fusarium, to the detriment of desirable plant growth, and Aspergillus, which produces Aflatoxins.

Each of the prior-art slow-release fertilizers is intended to allow nutrients to remain in the soil near plants treated therewith for extended periods of time so that the nutrients are released gradually and become available to the plants. However, the presently available products have one or more deficiencies, including:
(1) variable rate of nutrient release,
(2) undesirably high rate of nutrient release, which is wasteful and possibly damaging to plants,
(3) undesirably high ratios of carrier to nutrient,
(4) deficiency of one or more essential nutrients,
(5) poor storage life,
(6) carrier is not bio-degradable and not a source of nutrients.

OBJECTS OF THE INVENTION

It is an object of this invention to provide an economical, easily prepared slow-release fertilizer by impregnation of a natural, organic, highly absorbent carrier material, such as peanut hulls with a nutrient material rich in nitrogen, phosphorous, potassium and trace elements along with a chemically complete and balanced plant nutrient.

It is another object to provide a process which does not alter the solubility of the nutrient material, and which provides a coating of a lignin-containing extract obtained from the peanut hulls which blocks solubility of the nutrient material.

It is another object to provide a waste material containing yeast, which increases the nitrogen content of the fertilizer in a form slowly released and readily utilizable by soil microorganisms. In addition, the yeast provides a source of fatty acids.

It is a further object to provide a slow-release fertilizer in which the nutrients become available at a slow and controlled rate because before they can be leached away from the peanut hulls the organic carrier of the nutrients must decompose. In addition, the peanut hull not only acts as the carrier for the nutrients but is itself a nutrient material, which, once its natural nutrients have been made available to plant, the carrier (peanut hull) has decomposed to a humus which provides texture to the soil.

It is a further object to provide other slow-release products, such as insecticides, herbicides, fungicides, and bacteriocides by impregnating, by the same process, peanut hulls with insecticides, herbicides, etc.

SUMMARY OF THE INVENTION

This invention relates, in one aspect, to a process for the preparation of a slow-release fertilizer comprising the steps of:

(a) grinding a first volume of peanut hulls to a particle size of 1/32 to ⅛ inch and a second volume to ½ to ¼ inch, (b) treating said first a volume of hulls with an equal volume of 2N (normal) nitric acid for 30 minutes at 121 degrees C. and 15 p.s.i. pressure to extract and solubilize the liqueous material from the hulls, (c) adding 1 volume of 1 normal solubilized sodium hydroxide to 2 volumes of said second volume of peanut hulls and heating and stirring said mixture until said nutrients are solubilized, (d) heating said second volume of peanut hulls and sodium hydroxide with steam at a temperature of 121 degrees C. and pressure of 15 p.s.i. for 30 minutes to open the fibers of said hulls, (e) adding fertilizer nutrients, such as commercially available potash or other source of potassium, super phosphate or other source of phosphate and ammonium nitrate or other source of nitrogen, to liquid waste material from the beer brewing industry containing either live or autolysed yeast or other biological waste material, (f) drying said heat-treated peanut hulls, whereby the fibers of the hulls close, entrapping said nutrients and said waste material, (g) soaking said dried, impregnated hulls with the lignin-containing liquid from step (b), and (h) drying the peanut hulls.

In another embodiment, the biological waste material is added to the peanut hulls as a solubilizing liquid with the sodium hydroxide in step (c), and the fertilizer nutrients are added only after the heat treatment is completed.

In a broader aspect, the invention relates to a slow-release product, including, in addition to fertilizer, herbicides, insecticides, fungicides and bacteriocides. In the case of some herbicides, microorganisms in the soil will degrade the herbicides and it is desirable to incorporate a bacteriocide to prevent the microorganisms from destroying the herbicides during the release period to the roots of undesirable plants. In any case, the process of making the slow-release product is the same as described herein for the slow-release fertilizer. Incorporation of an insecticide into the hulls and spread on the ground or tilled in will provide a long-lasting, slowly released systemic poison for insects when taken up through the roots of plants. Bacteriocides, which will selectively inhibit denitrification by certain organisms, could be impregnated into peanut hulls in the same manner to prevent loss of nitrogen from soil or fertilizers into the air.

The invention also relates to a slow-release fertilizer comprising a carrier made from peanut hulls impregnated with yeast-containing material and plant nutrients and having a lignin coating thereover which blocks solubility of the plant nutrients until the peanut hulls have decomposed. As the peanut hulls slowly decompose, the solubility-blocking lignin coating is removed, thus exposing new amounts of nutrient ingredients to water in the soil whereby they can become solubilized. Thus solubility is slowed to the rate of decomposition of the hulls and made more uniform.

DETAILED DESCRIPTION OF THE INVENTION

Ground peanut hulls are preferred as the carrier base for the slow-release fertilizer of the invention. They are comminuted by grinding to a particle size in the range of approximately 1/32 to ½ inch.

A portion of each batch is separated from the rest, preferably ground to a particle size of approximately 1/32 to ⅛ inch, and treated with an equal volume of 2N nitric acid. This treatment can be from 10 to 60 minutes at a temperature of 100 to 140 degrees C. and pressure of from 10 to 25 p.s.i., but a preferred treatment is for 30 minutes at about 121 degrees C. and 15 p.s.i to destroy any fungus, such as Fusarium or Aspergillus on the hulls. Lignin from the hulls is solubilized by the nitric acid. The liquid, after solubilization, is separated and utilized in the process, as will be later described. The portion of hulls treated in this manner can be from about 5 to 25% of the original batch and preferably about 15%. The thus-treated hulls are disposed of.

The portion of hulls not treated by nitric acid, ground to a preferred particle size of approximately ⅛ to ¼ inch, is first treated with sodium hydroxide (NaOH), which is, preferably, mixed and heated with a liquid waste material and stirred until the sodium hydroxide dissolves. The peanut hulls are mixed with the sodium hydroxide-waste solution and heated with steam under pressure to a temperature of about 100 to 150 degrees C. and pressure of 10 to 25 p.s.i. for a period of time of 20 to 60 minutes, preferably at 121 degrees C. and 15 p.s.i. pressure for 30 minutes. To obtain the best results, a 1 normal (N) sodium hydroxide solution (about 4% by weight) should be used. However, the process is effective when concentrations of 2-6% by weight are used. Below 2%(wt) the fibers of the hulls are insufficiently affected and not opened. Above 6%(wt) the hulls are too completely broken down to provide satisfactory results of impregnation. During this treatment the NaOH causes the fibers of the hulls to open, i.e., the ligno cellulose in the hulls to swell, thereby allowing more complete penetration by the nutrient-waste material mixture by opening the inner surfaces of said hulls to adsorption and/or absorption of said mixture. The material is also sterilized by the treatment.

The hulls, while still warm and wet, are contacted with a nutrient solution, which may contain the liquid waste material if not added during the treatment with NaOH. However, the inorganic fertilizer nutrients are subject to chemical action if contacted with NaOH under the conditions set forth above, and hence are added to the hulls only after the treatment at high temperature and pressure are completed.

After the hulls are impregnated with the liquid waste material and inorganic nutrients, they are dried. The drying step causes the fibers to close, trapping the impregnated material within the structure of the hulls.

In order to increase the nitrogen content of the fertilizer and also provide a source of fatty acids, liquid waste material preferably from the brewing industry containing either live or autolysed yeast can be impregnated into the hulls. Other liquid biological waste materials may also be used instead of brewer's waste. Brewer's waste material may be added either with the sodium hydroxide or with the fertilizer nutrients, which are always added to the peanut hulls after the step of heating under pressure, since undesirable chemical reactions with the inorganic nutrients will take place under those conditions. However, other industrial wastes and brewer's waste containing live yeast must be added before the sodium hydroxide and peanut hulls are autoclaved in order to destroy the yeast cells or any pathogen contained in the waste material. It is desirable to add the liquid waste material to the hulls at the time the NaOH is added to reduce the total liquid needed, thereby reducing the drying requirements. Additionally, the NaOH reacts with fatty acids contained by the yeast cells to form soaps. Soaps are highly beneficial to the soil since they will release inorganic ions tied up by soil particles and, hence, not otherwise available for utilization by the plant.

Inorganic fertilizer nutrients include a source of potassium, such as potash, a source of phosphorus, such as super phosphate, and a source of nitrogen, such as ammonium nitrate or urea. Various ratios of these nutrients and their use for particular plants are well known and, hence, should be varied to fit the intended use. Other minor nutrients may be added as well, such as those disclosed in said application Ser. No. 850,522.

The impregnated and dried peanut hulls are then soaked in the liquid resulting from the treatment of peanut hulls with nitric acid and which contains dissolved lignin. Following the soaking step, which may take from 10 to 30 minutes, the hulls are dried removing 80-95% of the moisture.

A coating of insoluble lignin remains on the surfaces of the hulls, covering the hulls and the waste material and nutrients previously deposited therein. The nitric acid solution also serves to neutralize the sodium hydroxide. Considerable carbohydrate materials dissolved from the peanut hulls are contained in the nitric acid solution impregnated on the peanut hulls used as fertilizers. The carbohydrate and nitric acid provide a readily available source of carbon and nitrogen for increasing the microbial population of the soil, thereby increasing its fertility. Because the lignin coating is not readily soluble in water or ground water, the nutrients are not released until the lignin and the hulls decompose. Thus, the process provides a fertilizer having slow-release properties. Furthermore, the release is quite uniform and follows the decay of the hulls. The plants will receive an initial dose of nitrogen from the nitric acid remaining on the lignin coating.

Compared to other slow-release fertilizers, the impregnated and coated peanut hulls of the present invention contain a larger amount of organic material, due to the incorporation of the liquid waste material in the hulls and the hulls themselves, which decompose and provide humus.

The yeast increases the nitrogen content of the fertilizer in a form that can be readily utilized by soil microorganisms. Furthermore, the nitrogen is slowly released, as the yeast cells deteriorate.

The peanut hull decomposes slowly and thus adds humus to the soil and, hence, serves additionally as a soil conditioner.

The peanut hulls produced by the above method have slow-release properties due to the fact that the plant nutrients (including those derived from the yeast-containing waste material) cannot be dissolved by ground water until the hulls have decomposed, due to the insoluble lignin coating over the entire hull. Before impregnating the hulls, the fibers thereof are opened by treatment with sodium hydroxide.

The peanut hulls produced according to the invention can be applied at the usual rates for specific purposes, e.g., 110 to 240 cubic feet per acre. As a slow-release fertilizer, instead of the usual rate of monthly applications of liquid fertilizers, three times the amount may be applied at once and no further application made for three months. Moreover, the slow-release product of the invention may last for up to a year or more depending upon the thickness of the lignin coating, making even less frequent applications necessary.

If desired, the particles of impregnated hulls could be pelletized, thereby increasing the length of time the fertilizer material is released from the peanut hulls. They may also be produced in granulated form if the impregnated and dried hulls are sprayed with the lignin solution in a cyclone chamber.

EXAMPLES

The following examples will illustrate the invention:

EXAMPLE 1

(a) 3500 liters of peanut hulls are hammer milled to a particle size of approximately ¼ inch;

(b) 500 liters of ⅛ inch peanut hulls are treated with 500 liters of 2N (normal) nitric acid for 30 minutes at 121 degrees C. and 15 p.s.i. pressure. The liquid is retained for use in step (h).

(c) 1500 liters of the yeast waste material from the brewing industry or other industrial wastes that contain biological waste material and 16 kg of sodium hydroxide are added. This mixture is heated and agitated until the chemicals are placed into solution.

(d) 3000 liters of peanut hulls from (a) are mixed with the solution from (c). The peanut hulls will thus become impregnated with the waste material, sodium hydroxide and the biological waste material.

(e) The mixture is then subjected to steam and pressure (121 degrees C. and 15 p.s.i.) for 30 minutes. This process sterilizes the material, and at the same time, because of the sodium hydroxide, opens the fibers of the hulls so that the fibers can be impregnated with a solution of inorganic fertilizer nutrients and the biological material.

(f) While the hulls are hot, 300 kg of commercially available potash, 300 kg of super phosphate and 400 kg of ammonium nitrate or other commercially available chemicals which will supply equivalent amounts of potassium, phosphate and nitrogen are added.

(g) The impregnated hulls are then dried to 80–95% dryness.

(h) The dried, impregnated peanut hulls from (f) are then soaked in the liquid described in (b).

(i) Soaked peanut hulls are dried and can be utilized as is, or after being pelletized.

EXAMPLE 2

Two (2) liters (1) of ⅛ inch peanut hulls and 2 l. of 2N nitric acid were mixed and autoclaved at 121 degrees C. and 15 p.s.i. for 30 minutes. One (1) liter extract was obtained.

40 gm. sodium hydroxide was dissolved in 1 l. brewer's yeast with heating and poured onto 2 l. ⅛ inch ground peanut hulls. This mixture was autoclaved for 30 minutes at 121 degrees C. and 15 p.s.i. After autoclaving, the following mixture of plant nutrients was added to the warm, wet hulls taken from the autoclave:

124 ml. 10:30 (mixture of ammonia and mono ammonium phosphate)

198 ml. 32%N (commercial source of nitrogen)(50% Ammonium nitratet 50% urea) 98 g. $K_2O$ in 250 ml. water.

The hulls were dried and the liter of lignin extract was mixed with the hulls. The hulls were again dried. The fertilizer product obtained had a pH of 6, nitrogen content of 8%, $P_2O_5$ of 4.4% and $K_2O$ of 4.9%.

I claim:

1. A slow-release fertilizer comprising a carrier material consisting of comminuted peanut hulls, the fibers of which having been opened by treatment with NaOH, fertilizer ingredients impregnated in the fibers of said hulls and a coating of lignin coated over said impregnated hulls, whereby said fertilizer ingredients are released only on decomposition of said hulls.

2. The slow-release fertilizer of claim 1, wherein said lignin is obtained from peanut hulls.

3. The slow release fertilizer of claim 1, wherein said fertilizer ingredients comprise a yeast-containing waste material.

4. The slow release fertilizer of claim 1, wherein said fertilizer ingredients comprise a biological waste material.

5. The process of claim 4, wherein said sodium hydroxide has a concentration of about 1N.

6. A process for the preparation of a carrier material impregnated with active ingredients comprising the steps of:

(a) grinding peanut hulls to a particle size of 1/32 to ½ inch, (b) heating under pressure a first volume of said hulls with an equal volume of concentrated nitric acid, (c) adding sodium hydroxide with a solubilizing liquid to a second volume of said peanut hulls, heating and stirring said mixture until said sodium hydroxide is solubilized, (d) heating said peanut hulls with steam under pressure, (e) adding an active ingredient selected from the group consisting of fertilizers' herbicides, insecticides, fungicides and bacteriocides to said second volume of peanut hulls, (f) drying said impregnated peanut hulls, (g) soaking said dried, impregnated hulls with the liquid from step (b), and (h) drying the peanut hulls.

7. The process of claim 6, wherein said nitric acid has a concentration of about 2N (normal) and the ratio of peanut hulls to nitric acid is about 1:1.

8. The process of claim 6 wherein the volume ratio of peanut hulls to sodium hydroxide is about 2:1.

9. The process of claim 6, wherein the waste material is added to said peanut hulls with said sodium hydroxide.

10. The process of claim 6, wherein said step (b) is carried out at 121 degrees C. and 15 p.s.i. for 30 minutes.

11. A process for the preparation of a slow-release fertilizer comprising the steps of:

grinding peanut hulls to particulate size; impregnating said ground peanut hulls with a solution of fertilizer nutrients and a biological waste material containing yeast and drying said treated peanut hulls; the improvement comprising adding alkali to the hulls to open the fibers thereof and heating prior to impregnating said hulls; soaking the dry, impregnated hulls with a lignin solution and drying said peanut hulls.

12. The process of claim 11, wherein said lignin solution is obtained from peanut hulls by treating said hulls with 2N nitric acid.

13. A process for the preparation of a slow-release fertilizer comprising the steps of:
(a) grinding peanut hulls to a particle size of 1/32 to ⅛ inch,
(b) heating under pressure a first volume of said hulls with an equal volume of concentrated nitric acid,
(c) adding solubilized sodium hydroxide to a second volume of said peanut hulls,
(d) heating and stirring said second volume of hulls until said sodium hydroxide is solubilized,
(e) adding a liquid waste material from the beer brewing industry containing live or autolysed yeast or other biological waste material to said second volume of peanut hulls with said sodium hydroxide in step (c) or in step (g),
(f) heating said peanut hulls with steam under pressure,
(g) impregnating said hulls while still wet with fertilizer nutrients,
(h) drying said impregnated peanut hulls,
(i) soaking said dried, impregnated hulls with the liquid from step (b), and
(j) drying the peanut hulls.

14. The process of claim 13, wherein said sodium hydroxide in step (c) is solubilized by said liquid waste material.

15. The process of claim 13, wherein the particle size of said first volume of hulls is about 1/32 to ¼ inch.

16. The process of claim 13, wherein the particle size of said first volume of peanut hulls is ⅛ to ¼ inch.

17. The process of claim 13, wherein the concentration of said nitric acid is 2 normal and said hulls are heated with said acid at 121 degrees C. and 15 p.s.i. for 30 minutes.

18. The process of claim 13, wherein said peanut hulls and said dissolved sodium hydroxide are heated with steam at 121 degrees C. and 15 p.s.i. for 30 minutes.

19. A carrier material for slowly releasing active ingredients selected from the group consisting of fertilizer nutrients, herbicides, pesticides and bacteriocides comprising comminuted peanut hulls, the fibers of which having been opened by treatment with sodium hydroxide, an active ingredient impregnated in the fibers of said hulls, and a coating of lignin coated over said impregnated hulls, whereby said active ingredients are released only on decomposition of said hulls.

20. The carrier material of claim 19, wherein said active ingredients comprise inorganic fertilizer nutrients and a biological waste material.

21. The carrier material of claim 20, wherein said biological waste material contains yeast.

* * * * *